United States Patent
Holmes

(10) Patent No.: US 12,263,961 B2
(45) Date of Patent: Apr. 1, 2025

(54) MANEUVERING OF SATELLITES WITHOUT RATE SENSORS

(71) Applicant: Maxar Space LLC, Palo Alto, CA (US)

(72) Inventor: Thomas Joseph Holmes, Rapid City, SD (US)

(73) Assignee: Maxar Space LLC, Palo Alto, CA (US)

( * ) Notice: Subject to any disclaimer, the term of this patent is extended or adjusted under 35 U.S.C. 154(b) by 248 days.

(21) Appl. No.: 17/850,164

(22) Filed: Jun. 27, 2022

(65) Prior Publication Data

US 2023/0415925 A1    Dec. 28, 2023

(51) Int. Cl.
*B64G 1/24* (2006.01)
*B64G 1/26* (2006.01)
*B64G 1/36* (2006.01)
*B64G 1/28* (2006.01)

(52) U.S. Cl.
CPC ............... *B64G 1/244* (2019.05); *B64G 1/26* (2013.01); *B64G 1/361* (2013.01); *B64G 1/245* (2023.08); *B64G 1/28* (2013.01); *B64G 1/36* (2013.01)

(58) Field of Classification Search
CPC .. B64G 1/245; B64G 2001/245; B64G 1/244; B64G 1/361; B64G 1/363; B64G 1/26; B64G 1/36; B64G 1/28; G01S 3/7867; G01C 21/025; G05D 1/0883; G05D 1/0808; B64C 15/00
See application file for complete search history.

(56) References Cited

U.S. PATENT DOCUMENTS

| | | | | |
|---|---|---|---|---|
| 3,866,025 A * | 2/1975 | Cavanagh | ................ | B64G 1/26 701/13 |
| 6,012,000 A * | 1/2000 | Holmes | .................. | B64G 1/244 701/13 |
| 6,068,217 A * | 5/2000 | Stoen | ..................... | B64G 1/363 244/164 |
| 6,125,310 A | 9/2000 | Holmes | | |
| 6,205,378 B1 * | 3/2001 | Rodden | .................... | B64G 1/26 244/171.1 |
| 2002/0117585 A1* | 8/2002 | Yoshikawa | ............ | B64G 1/361 244/171 |

(Continued)

OTHER PUBLICATIONS

Witten, Ben, et al., "Quaternion-based Signal Processing," SEG, New Orleans Annual Meeting, Aug. 2006, 5 pages.

(Continued)

*Primary Examiner* — Khoi H Tran
*Assistant Examiner* — Tanner L Cullen
(74) *Attorney, Agent, or Firm* — Pearl Cohen Zedek Latzer Baratz LLP

(57) ABSTRACT

An attitude control system for a satellite is presented that can determine on time values for attitude control thrusters without use of attitude rate sensors, such as those based on gyros. The attitude control systems uses the attitude values from a star tracker to determine both attitude adjustment values and attitude adjustment rate values directly from the star tracker values, where the processing is performed using quaternions. From the attitude adjustment values and attitude adjustment rate values, a set of thruster on time values are determined.

20 Claims, 8 Drawing Sheets

(56) References Cited

U.S. PATENT DOCUMENTS

| | | | |
|---|---|---|---|
| 2013/0221160 A1* | 8/2013 | Liu | B64G 1/244 |
| | | | 244/165 |
| 2014/0236401 A1* | 8/2014 | Tsao | B64G 3/00 |
| | | | 701/13 |
| 2015/0284112 A1* | 10/2015 | Kronhaus | B64G 1/413 |
| | | | 244/169 |
| 2015/0310276 A1 | 10/2015 | Strietzel et al. | |
| 2016/0046395 A1* | 2/2016 | Mansour | B64G 1/283 |
| | | | 701/13 |
| 2016/0349058 A1* | 12/2016 | Yu | H01Q 3/02 |
| 2020/0174094 A1 | 6/2020 | Tchilian | |

OTHER PUBLICATIONS

Jia, Yan-Bin, "Quaternions and Rotations," Stanford University, [https://graphics.stanford.edu/courses/cs348a-17-winter/Papers/quaternion.pdf], Sep. 2013, 12 pages.

* cited by examiner

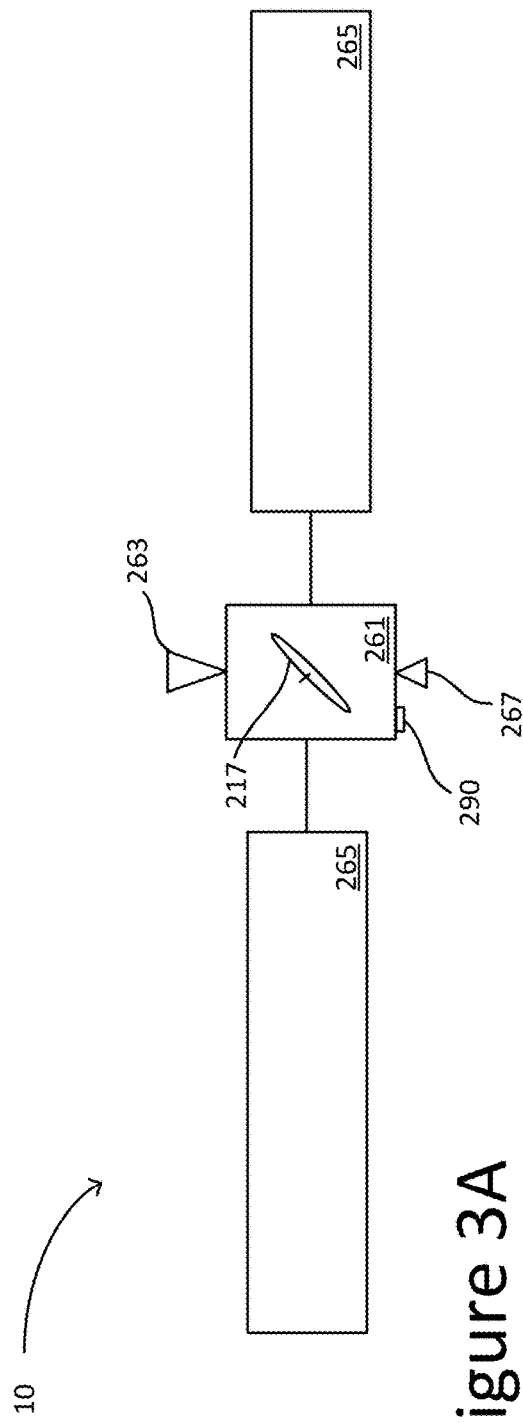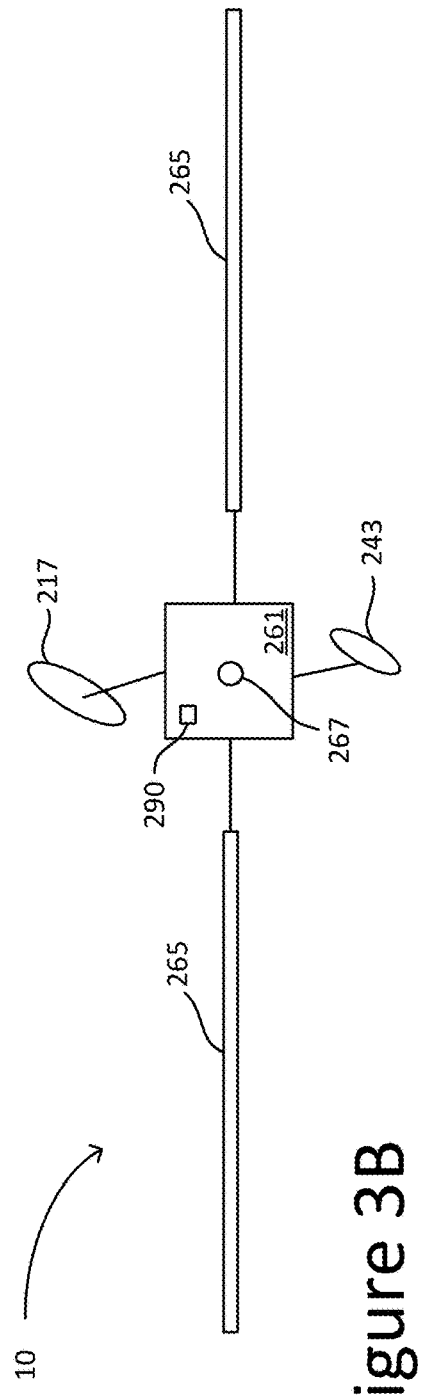

MANEUVERING OF SATELLITES WITHOUT RATE SENSORS

BACKGROUND

In order for a satellite to successfully accomplish its mission, it needs to accurately maintain its orbit and altitude. Because of this, the orbit and attitude of the satellite must be periodically adjusted to compensate for disturbances that occur in space or for the purpose of changing the mission. Such adjustments are obtained by the firing thrusters mounted on the satellite to create forces along the proper axis to attain the desired maneuver. To accomplish this, on onboard computers analyze data relating to the actual attitude Obtained from onboard sensors and compares these to the desired attitude, which may be periodically updated by a ground station mission controls operator. The onboard computer generates on time signals, energizing the thrusters to compensate for errors in attitude. This control process is rendered significantly more complex because of inherent inconsistencies in the thruster firings. In addition, the forces exerted on the satellite during the thruster firing create additional attitude disturbances which are aggravated by flexible components on the satellite such as antennae and solar arrays. These disturbances are reflected in the signals from on board sensors. All of these factors create errors in spacecraft attitude that must be managed.

BRIEF DESCRIPTION OF THE DRAWINGS

FIGS. 3A and 3B illustrate two views of a deployed spacecraft with an imaging system.

DETAILED DESCRIPTION

The following presents techniques and structures for attitude control of a satellite or, more generally, spacecraft without use of rate sensors for determining on times for attitude control thrusters. By removing the rate sensor requirement for attitude control, the embodiments presented in the following simplify the spacecraft design for hardware, software, electronics and operations. These simplifications and the lack of gyros can result in overall cost savings for the satellite delivery and an increase in lifetime of operations.

An attitude control system for a satellite is presented that can determine on time values for attitude control thrusters without use of attitude rate sensors, such as those based on gyros. The attitude control systems uses the attitude values from a star tracker to determine both attitude adjustment values and attitude adjustment rate values directly from the star tracker values, where the processing is performed using quaternions. From the attitude adjustment values and attitude adjustment rate values, a set of thruster on time values are determined.

Figure 1:
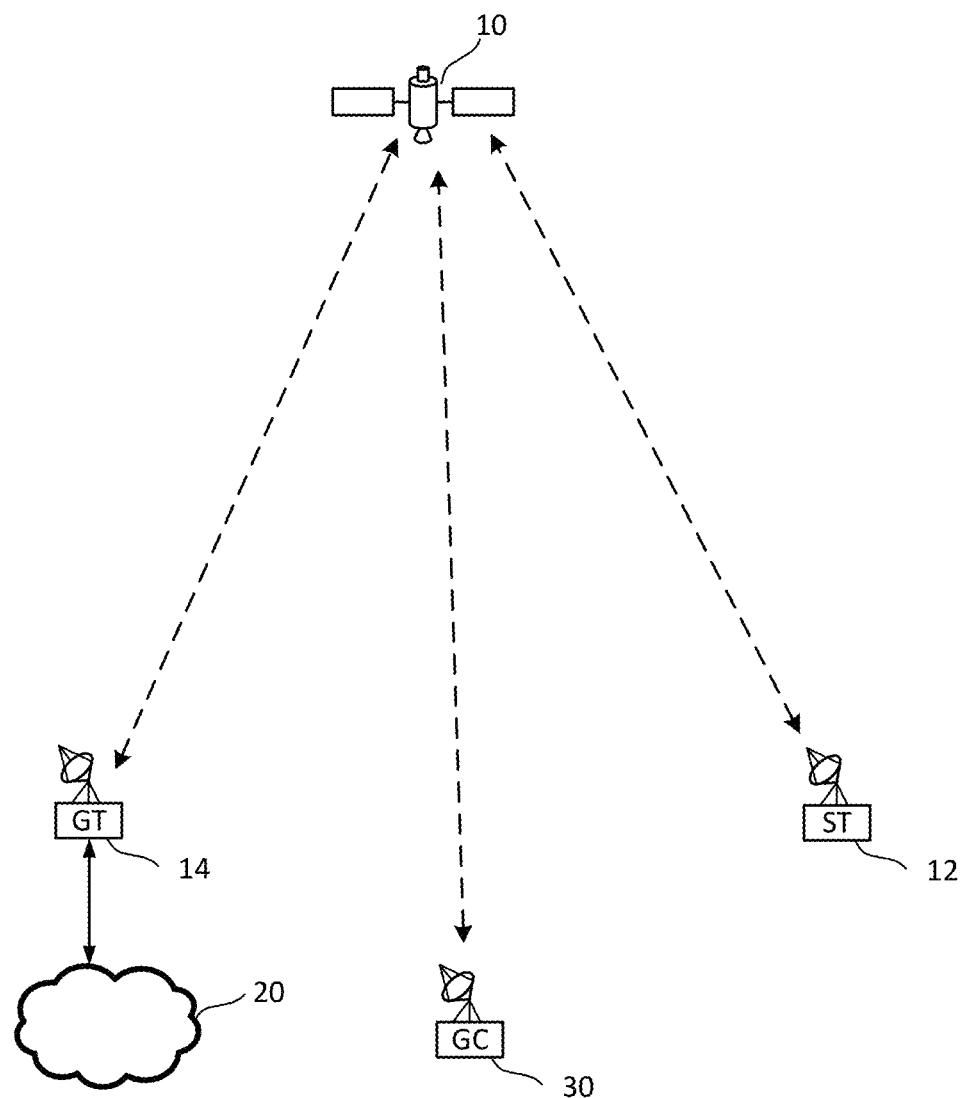
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.) or even aircraft, such as drones. Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows satellite 10 to provide internet connectivity to a plurality of subscriber terminals (e.g., subscriber terminal 12) via gateway 14. Ground control terminal 30 is used to monitor and control operations of spacecraft 10. When reference is made to a specific embodiment for the spacecraft 10, the example of an imaging or optical satellite will often be used in the following, although the techniques are more widely applicable, including other or additional payloads such as for a communication satellite.

Figure 2:
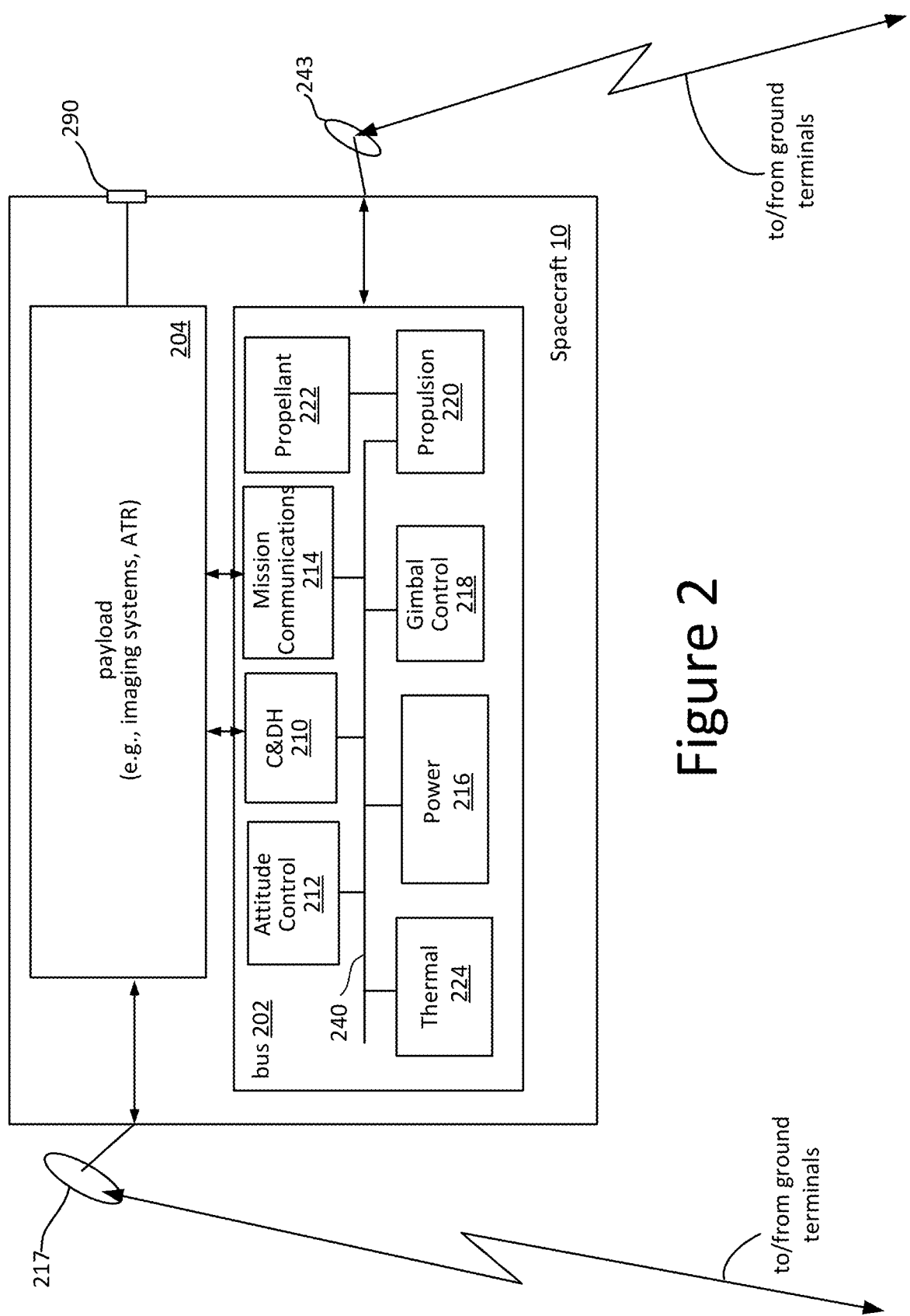
FIG. 2 is a block diagram of an example spacecraft.

FIG. 2 is a block diagram of one embodiment of spacecraft 10, which in one example is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as an imaging satellite or communications satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when the spacecraft 10 is in operation. Also represented are an antenna 243, that is one of one or more antennae used by the mission communications 214 for exchanging communications for operating of the spacecraft with ground terminals, and a payload antenna 217, that is one of one or more antennae used by the payload 204 for exchanging communications with ground terminals, such as the antennae used by a communication satellite embodiment. Other equipment can also be included: for example, imagining systems of the payload 204 may be used in conjunction with other payload systems.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for an optical system including imaging and processing capabilities and can include a lens and digital image sensor 290 to provide image data. The payload can also include an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30.

FIGS. 3A and 3B look an exterior view for an embodiment of spacecraft 10 in more detail. More specifically, FIGS. 3A and 3B show two views of an embodiment of spacecraft 10, where FIG. 3B shows the spacecraft rotated by 90° about the axis of the solar arrays 265 relative to FIG. 3A. A number of different embodiments are possible, but the example of FIGS. 3A and 3B can be used to illustrate some of the elements relevant to the current discussion. The spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the satellite body 261 are a number of thrusters, as shown at 263 and 267, which typically include one or more main thrusters and a number of attitude and orbit control thrusters, as discussed further with respect to FIG. 4. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control 218 about the longitudinal axis (the left-right axis in FIGS. 3A and 3B), in order to achieve or maintain a desired attitude with respect to, for example, the sun. For embodiments in which the deployed arrays 265 include a solar array, the solar array may be articulable so as to be substantially sun facing. The deployed solar array 265 may be sized and positioned so as to generate substantially more power from sunlight than would be possible if the solar array was fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

Also represented in FIGS. 3A and 3B is an optical port of 290 located on an external surface of the spacecraft. In FIG. 3A the optical port 290 is on a downward-facing surface and on an outward facing surface in the rotated view of FIG. 3B. As discussed further in the following, an optical port 290 including lens and an image sensor can be pointed upwards to provide image data for a star tracker. FIGS. 3A and 3B show only a single optical port, but other embodiments can include multiple such ports.

A satellite 10 may be launched from Earth and placed in a desired orbit with a desired orientation to perform its function or functions (e.g., to maintain coverage of a designated area or areas). Over time, a satellite may drift from its desired orbit and/or orientation so that it can no longer perform its function(s) in a satisfactory manner. One or more thrusters (e.g., thrusters 263, 267) may be provided to move such a satellite back to its desired orbit and/or orientation. Such thrusters may be fired according to a thruster firing pattern that is calculated to produce a specified movement to return the satellite to its desired orbit and/or orientation (orbital station-keeping).

In some cases, a satellite's desired orbit and/or orientation may change after it is launched (e.g., to perform some new function or to orient one or more satellite components towards a new target). Such a change or may require a movement of the satellite and a corresponding specified movement may be calculated and corresponding thruster firing pattern selected to achieve the specified movement (orbital maneuver).

In some cases, a service satellite may be used to service a target satellite to provide some external intervention. For example, a service satellite may dock with a target satellite so that it can refuel the target satellite (e.g., provide propellant and/or electrical current) and/or perform repair/replacement of components of the target satellite. In some cases, a service satellite may attach to a target satellite and may move the target satellite in a linear and/or rotational manner. In order to achieve a successful docking of a service satellite and target satellite, accurate movement of one or both may be required (e.g., to avoid damaging impact and/or misalignment, relative movement may be finely controlled).

The above examples of satellite movement (e.g., for returning to a desired orbit and/or orientation, changing to a new orbit and/or orientation, and facilitating docking of two or more satellites) should not be construed as limiting and the present technology may be applied to a thruster system used for movement of a satellite or other spacecraft for any purpose.

Figure 4:
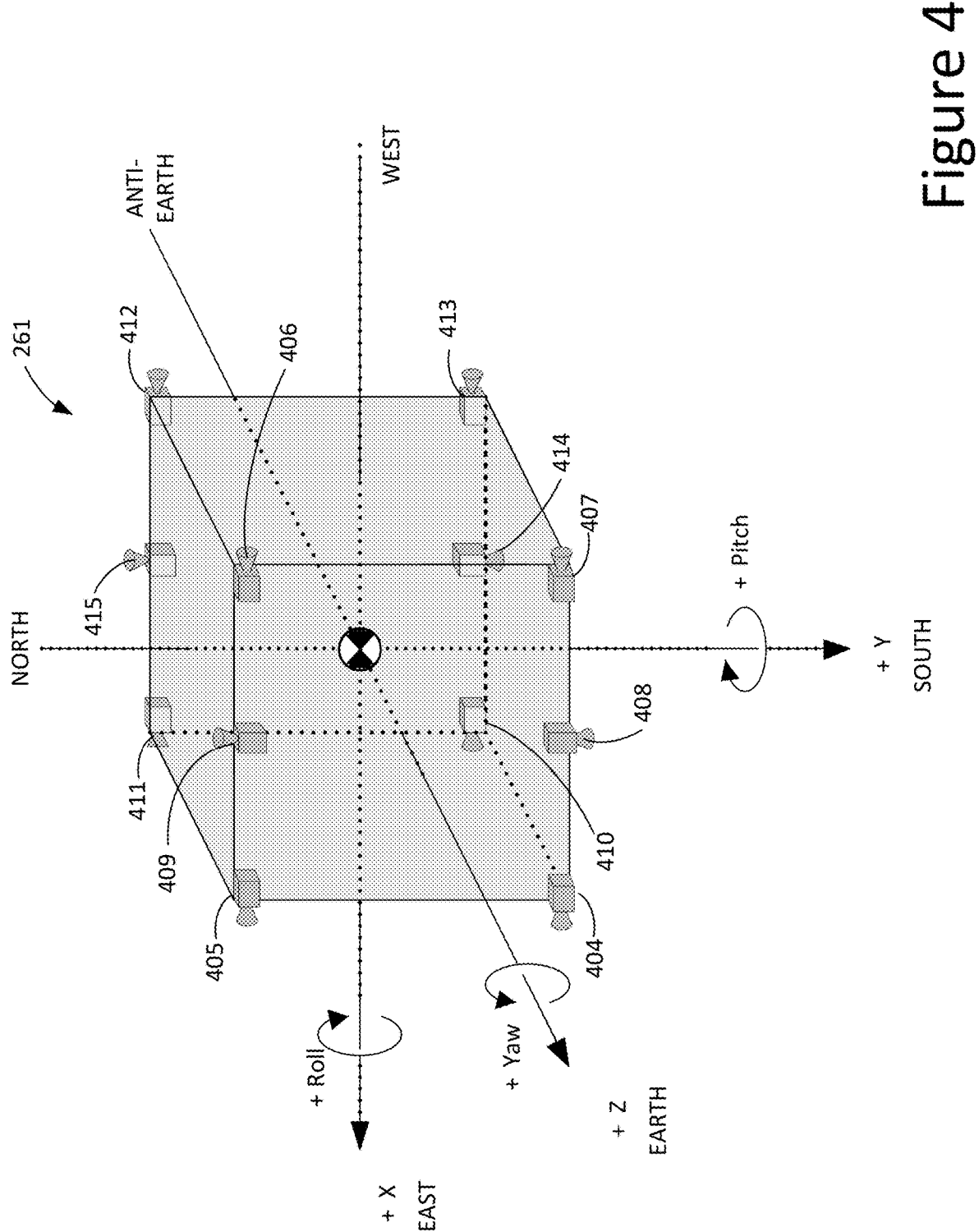
FIG. 4 shows an example of a satellite with attitude control thrusters.

FIG. 4 illustrates an example of a spacecraft body 261 (e.g., of satellite 10 or any of satellites) that includes a plurality of thrusters (e.g., thrusters 263, 267) to facilitate movement of satellite 10, including linear movement and rotational movement. Spacecraft body 261 is illustrated as a cube for simplicity (the present technology is not limited to any particular satellite shape or configuration and is not limited to a cube satellite or "CubeSat"). Thrusters may be physically attached to a frame, housing, or other component of spacecraft body 261 so that force generated by thrusters results in movement of spacecraft body 261.

Spacecraft body 261 is shown in perspective view with the X-direction extending across the view shown from right to left (with the +X to the left). The X-direction is along the west to east direction in this example (e.g., parallel to a line of latitude). The Y-direction extends downwards in this view (with +Y towards the bottom). The Y-direction is along the north to south direction in this example (e.g., parallel to a line of longitude). The Z-direction extends generally from back to front in this view (with +Z towards the front). The Z-direction is along the anti-earth to earth direction in this example (e.g., directed towards the center of the earth). Movement along any combination of the X, Y, and/or Z directions (west-east, north-south, and/or earth/anti-earth) may be considered linear motion. Arrows indicating the X-direction, Y-direction, and Z-direction intersect in the center of spacecraft body 261 in this example and these arrows also correspond to X, Y, and Z axes respectively for purposes of describing rotational movement. For example, rotation about the X-axis may be referred to as "roll," rotation about the Y-axis may be referred to as "pitch," and rotation about the Z-axis may be referred to as "yaw." Spacecraft body 261 may experience linear movement in one or more of the three dimensions (along X, Y, Z directions) illustrated and rotational movement about any of the three axes illustrated (about X, Y, Z axes) so that satellite may be considered to have six degrees of freedom (6 DOF).

Twelve thrusters are provided to implement linear and rotational movement of spacecraft body 261 (e.g., to provide movement with six degrees of freedom) in this example. In other examples, satellites may use different numbers of thrusters and the present technology is not limited to satellites with any number or configuration of thrusters. Four thrusters are located at vertices of spacecraft body 261 at corners of an earth-facing side, with east-facing thruster 404 at the southeast corner, east-facing thruster 405 at the northeast corner, west-facing thruster 406 at the northwest corner, and west-facing thruster 407 at the southwest corner. In addition, south-facing thruster 408 is located midway along the south edge and north-facing thruster 409 is located midway along the north edge of the earth-facing side. A similar arrangement is provided on the opposite side (anti-earth side) with east-facing thruster 410 at the southeast corner, east-facing thruster 411 in the northeast corner, west-facing thruster 412 in the northwest corner, and west-facing thruster 413 in the southwest corner. In addition, south-facing thruster 414 is located midway along the south edge and north-facing thruster 415 is located midway along the north edge of the anti-earth face. The number, locations, and orientations of thrusters in FIG. 4 are provided as an example and it will be understood that any suitable number of thrusters may be arranged in different locations and orientations according to the present technology. Furthermore, while spacecraft body 261 is shown in a particular orientation, it will be understood that spacecraft body 261 may be rotated to have a different orientation which may provide different thruster orientations (e.g., changing pitch by 90 degrees may bring thrusters 406, 407, 412, 413, which are shown as west-facing, into an earth-facing orientation).

Depending on the embodiment, the satellite thrusters (e.g., thrusters 404-415 of FIG. 4) can be chemical thrusters, electric thrusters, or bipropellant (bi-prop) thrusters. For example, a fuel and an oxidizer may be combined (burned) in a thruster to generate thrust. Both fuel and oxidizer may be considered as propellants. In some cases, a single propellant may be used. For example, some ion thrusters use a noble gas, such as Xenon or Krypton as a propellant, with ions of Xenon or Krypton being ejected from a thruster at high velocity to generate thrust. Sufficient propellant for an extended operational life may be provided in a satellite prior to launch and in some embodiment the satellite can be refueled on orbit.

The thrusters 404-415 work in conjunction with the attitude control systems 212 of the satellite 10, where the thrusters 404-415 create torque to adjust the attitude of the satellite, which is monitored by attitude control systems to provide data indicative of the actual thruster disturbances to the attitude rates of the satellite. After the satellite is placed in orbit, these systems can be used to maintain a predetermined attitude that can have set aground station computer and received at the mission communications 214 or generated on the spacecraft 10 to meet the requirements of a particular mission.

Figure 5:
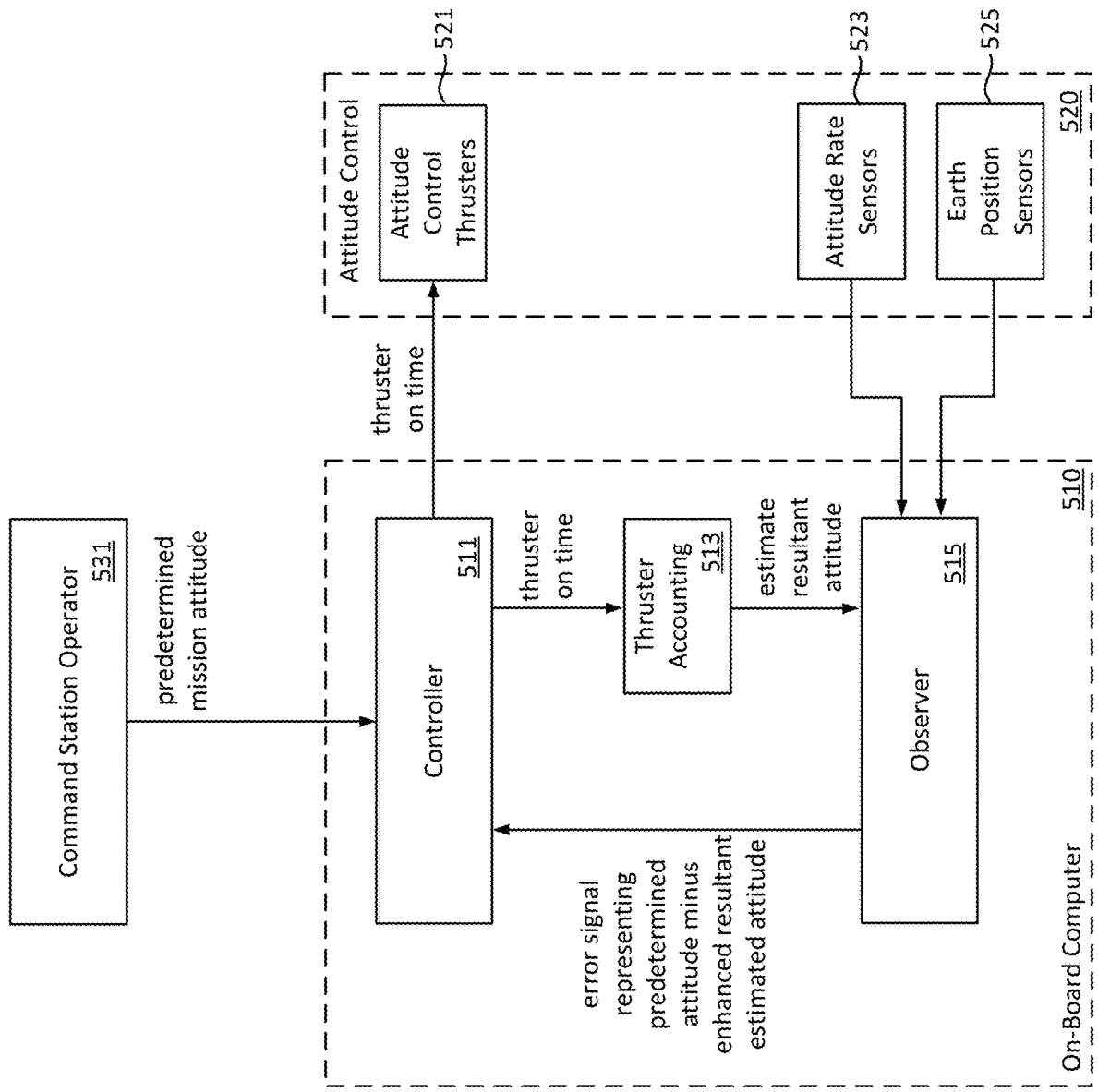
FIG. 5 is a block diagram of some elements of an attitude control system with gyro-based attitude rate sensors.

Due to a variety of influences present in space, the orbit of the satellite must be adjusted as the satellite shifts beyond its allocated orbital slot. One or more of the thrusters 404-415 can be fired to maintain the spacecraft's mission. Inherent inconsistencies with the thruster firings and the movement of large flexing arrays (e.g., solar arrays 265, antennae 263 and 267, and even thruster nozzles) cause torque disturbances that create errors in spacecraft attitude that must be managed. The attitude control systems 212 can include devices including torque rods, wheel drive electronics, and control momentum gyro control electronics, for example, that are used to monitor and control the attitude of the space craft. In particular, the usual approach to attitude control uses attitude rate sensors, such as based on gyros, to obtain derivatives (i.e., rates and changes of rate) of attitudes for stabilization of the spacecraft. FIG. 5 illustrates a gyro-based embodiment for attitude control.

FIG. 5 is a block diagram of some elements of an attitude control system embodiment with gyro-based attitude rate sensors. The components of FIG. 5 include attitude control 520 and on-board computer 510. The components of the block attitude control 520 include both elements to adjust the satellites attitude, such as the attitude control thrusters 521 that can correspond to the set of thrusters 404-415 of FIG. 4 and their control elements, and attitude sensors. The attitude sensors include gyro-based attitude rate sensors 523 and can also include other sensors, such as earth position sensors 525, for example. An on-board computer 510 determines the on times for the attitude control thrusters 521 based on the rate and position data from the attitude rate sensors 523 and other sensors. FIG. 5 represents three elements of the on-board computer 510: a controller 511, thruster accounting 513, and observer 515. Although represented as separate elements in FIG. 5 for purposes of discussion, may be implemented using some of the same components, such as processors and memory.

More specifically, the components of on-board computer 510 (as well as the embodiments described below with respect to FIGS. 7 and 8) can be implemented using hardware, firmware, software, or a combination of these. Depending on the embodiment, these elements of the embodiments described above, and also the embodiments below, can include hardware only or a combination of hardware and software (including firmware). For example, logic elements programmed by firmware to perform the functions described herein is one example of elements of the described systems. A CPU, GPU, or other microprocessor can include a processor, FGA, ASIC, integrated circuit or other type of circuit. The software used can be stored on one or more processor readable storage devices to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

The onboard computer 510 analyzes data relating to the actual attitude obtained from onboard sensors 523, 525 and compares such data to the desired attitude, which may be periodically updated by a ground station mission controls operator 531 prior to an orbital corrective maneuver. The onboard computer 510 generates on time signals, energizing the thrusters 521 to correct for any difference between spacecraft attitude and the desired mission attitude. The thrusters are fired in response to a signal which is calculated to reduce the attitude error to within predetermined performance limits. Therefore, attitude is continuously sensed, and analyzed, and error data is generated. The sensor data is analyzed by an onboard computer 510 having multiple algorithms programmed therein to perform the necessary functions to generate thruster on time signals and fire the thrusters.

In the embodiment of FIG. 5, the on-board computer 510 includes a controller module 511, thruster accounting module 513 and an observer module 515. Ground station operator 531 supplies information relating to mission attitude and performance requirements to computer 510. Based on the information from the ground station operator 531 and the observer module 515, controller module 511 can directly control the firing of the attitude control thrusters 521 by generating appropriate on time signals. The thruster accounting module 513 also receives the on time signals provided by the controller module 511. Thruster accounting module 513 can contain a table of individual thruster performance which it uses to estimate the attitude shifts that should occur from the attitude control thrusters 521 firing in response to the on time signal. The data, from which the estimates of thruster accounting module 513 are derived, can based on rigid body models (i.e., such data assumes that the spacecraft has no flexible appendages. Since accounting module 3 obtains these estimates based on rigid body models), but may be complicated by flexible components. Because of inherent inconsistencies in the forces generated by the thruster firing and movement of flexible components, the estimates of resultant attitude calculated by the thruster accounting module 513 contain errors.

Attitude related data from the attitude rate sensors 523 and, in some embodiments, additional sensors such as earth position sensors 525, are used to refine the estimates in observer module 515. The observer module 515 can be programmed with algorithms that generate data to assist the generation of on time signals by the controller module 511. Observer module 515 receives the estimated resultant attitude from the accounting module 513 and compares this data with data indicative of the actual attitude from the attitude rate sensors. The difference between the estimated resultant attitude and the sensed attitude is calculated and a first error signal is generated from these values. The estimated resultant attitude can be enhanced in accuracy by adjusting the estimated value in proportion to the first error signal. The adjusted estimates are incorporated in subsequent thruster firing cycles. In response to the enhanced estimated resultant attitude signal from observer module 515, controller module 511 calculates the error between the estimated/actual attitude indicated thereby compared to the required mission attitude, and generates a proportionate adjustment signal for the attitude control thrusters 521. This signal triggers thruster pulses to adjust the attitude.

Although the attitude control system of FIG. 5 can be quite effective, it is desirable to improve attitude control accuracy, particularly in more complex situations such as when a satellite include large flexing structures, such as solar arrays, and bi-prop thrusters. Additionally, it is important to balance accurate attitude control systems with other important concerns for satellites and spacecraft, such reduced mass, high reliability, and increased simplicity.

The following presents an attitude control system that can provide cost savings and increase lifetime of operations by removing the rate sensor requirement to simply spacecraft design for hardware, software, electronics, and operations. More specifically, embodiments presented below present an attitude control system without gyro-based attitude rate sensors, instead using star trackers to directly determine attitude adjustments using a no rate sensor algorithm. This allows for reduced mass, reduced software implementation, reduced operations/command support, can reduce bus (i.e., spacecraft) size, and can increase lifetime as gyros have a limited life. Relative to the embodiment of FIG. 5, the embodiments presented below do not use attitude rate sensors 523 or earth position sensors 525 for attitude control, and do not require an observer module 515, but instead use a star tracker for determining attitude and attitude adjustment and also for attitude rate and attitude rate adjustment.

A star tracker is an optical device that measures the positions of stars using photocells (such as a charge coupled device, or CCD, or CMOS photodetector) or a camera. The positions of many stars have been measured by astronomers to a high degree of accuracy and can be used as reference, so that a star tracker on a satellite or spacecraft can be used to determine the attitude of the spacecraft with respect to the stars. To do this, the star tracker obtains an image of the stars, measures their apparent position in the reference frame of the spacecraft, and identifies the stars so that their position can be compared with their known absolute position from a star catalog. A star tracker may include a processor to identify stars by comparing the pattern of observed stars with the known pattern of stars in the sky.

Figure 6:
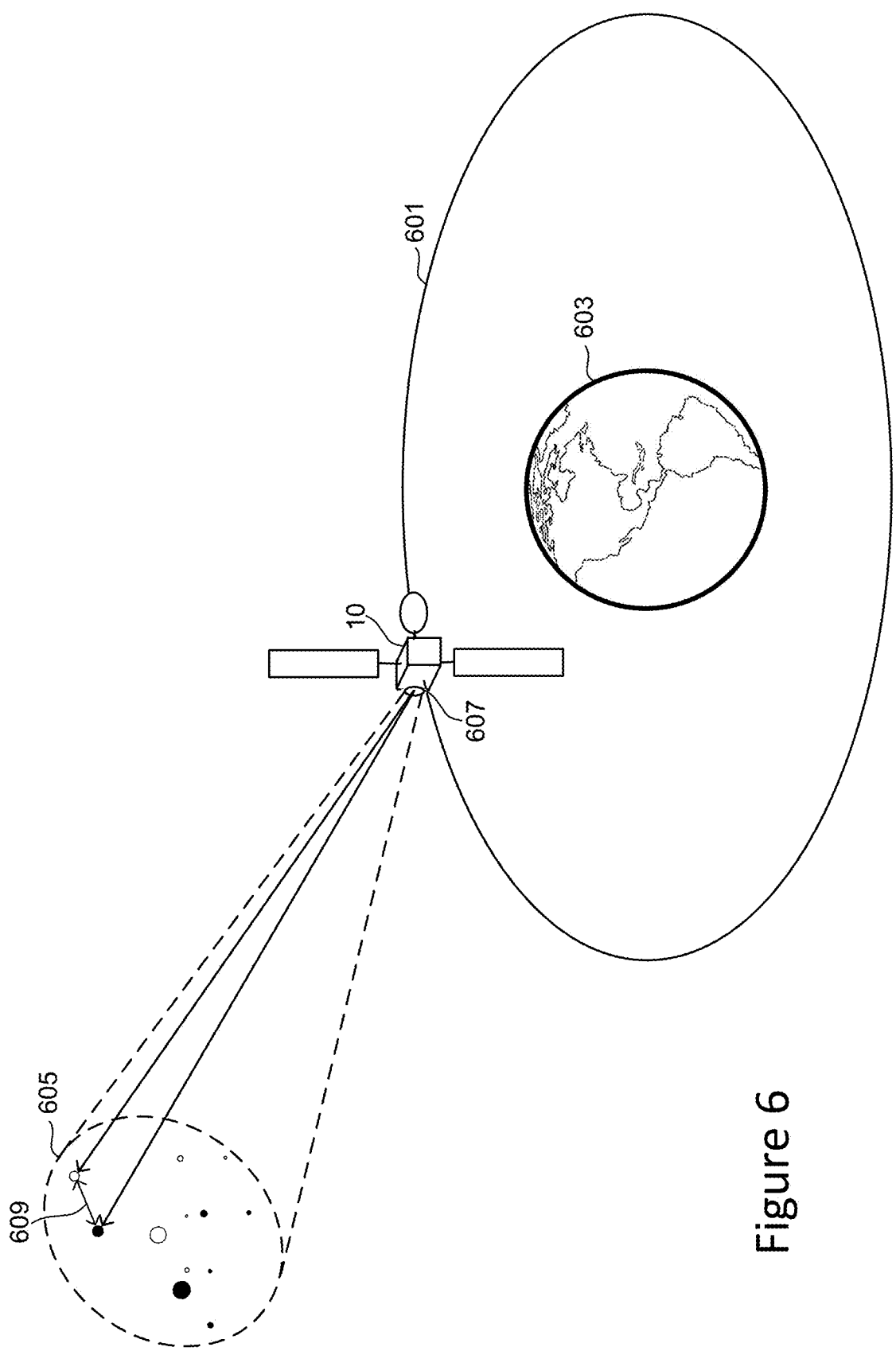
FIG. 6 illustrates the concept of a star tracker.

FIG. 6 illustrates the concept of a star tracker. In FIG. 6, a satellite 10 is on an orbit 601 around the earth 603, although, more generally, this can be a non-orbital spacecraft. The satellite 10 includes a star tracker 607 configured to detect stars within its field of view 605. Within the field of view are a set of stars (open circles) at their observed location. Also shown within the field of view 605 are the expected positions (solid circles) of the set of stars. By comparing the displacement 609 between the observed location and the expected location, the satellite 10 can determine its attitude. Although star trackers have been used to contribute to attitude determination, they are typically only one input to the computation and are not used for rate determinations, which have previously been provided by attitude rate sensors, such as those based on gyros. Outputs of a star tracker and the reference star locations are referenced to a common earth center inertial coordinate system, commonly the Earth center inertial coordinate system J2000, although other coordinate systems can be used.

One format for the output from a star tacker is a quaternion format. Quaternions are an extension of complex numbers and are a convenient mathematical notation for representing spatial orientation and rotations of elements in a three-dimensional space by encoding information on an axis-angle rotation about an arbitrary axis. Mathematically, quaternions are a representation of the double covering SU(2) (special unitary group of order 2) of the three dimensional rotation group SO(3) (special orthogonal group of order 3) and have a general form of:

$$q = c_r + ic_i + jc_j + kc_k,$$

where i, j, k are unit imaginary numbers and $c_r$, $c_i$, $c_j$, $c_k$ are real coefficients. This extends the more familiar complex number (of the form $c_r + i\ c_i$) to a non-commutative algebra with the relations:

$$i^2 = j^2 = k^2 = ijk = -1;$$

$$ij = k, jk = i, ki = j; \text{ and}$$

$$ji = -k, ik = -j, kj = -i.$$

For a pure rotation without translation, or a unitary transformation, $c_r^2 + c_i^2 + c_j^2 + c_k^2 = 1$. A coordinate frame transformation of a (right handed) an angle $\theta$ about a unit vector $\lambda$ can then be represented as:

$$q = \cos(\theta/2) - q_\lambda \sin(\theta/2),$$

where $q_\lambda = i\lambda_x + j\lambda_y + k\lambda_z$.

Because quaternion based calculations are difficult to implement in typical processing algorithms, their output is traditionally converted into another format (such as the roll, pitch, and yaw angles) for processing. The embodiments presented in the following embodiments instead work in quaternion processing for determining attitude adjustment and also attitude adjustment rates from the star tracker outputs.

Figure 7:
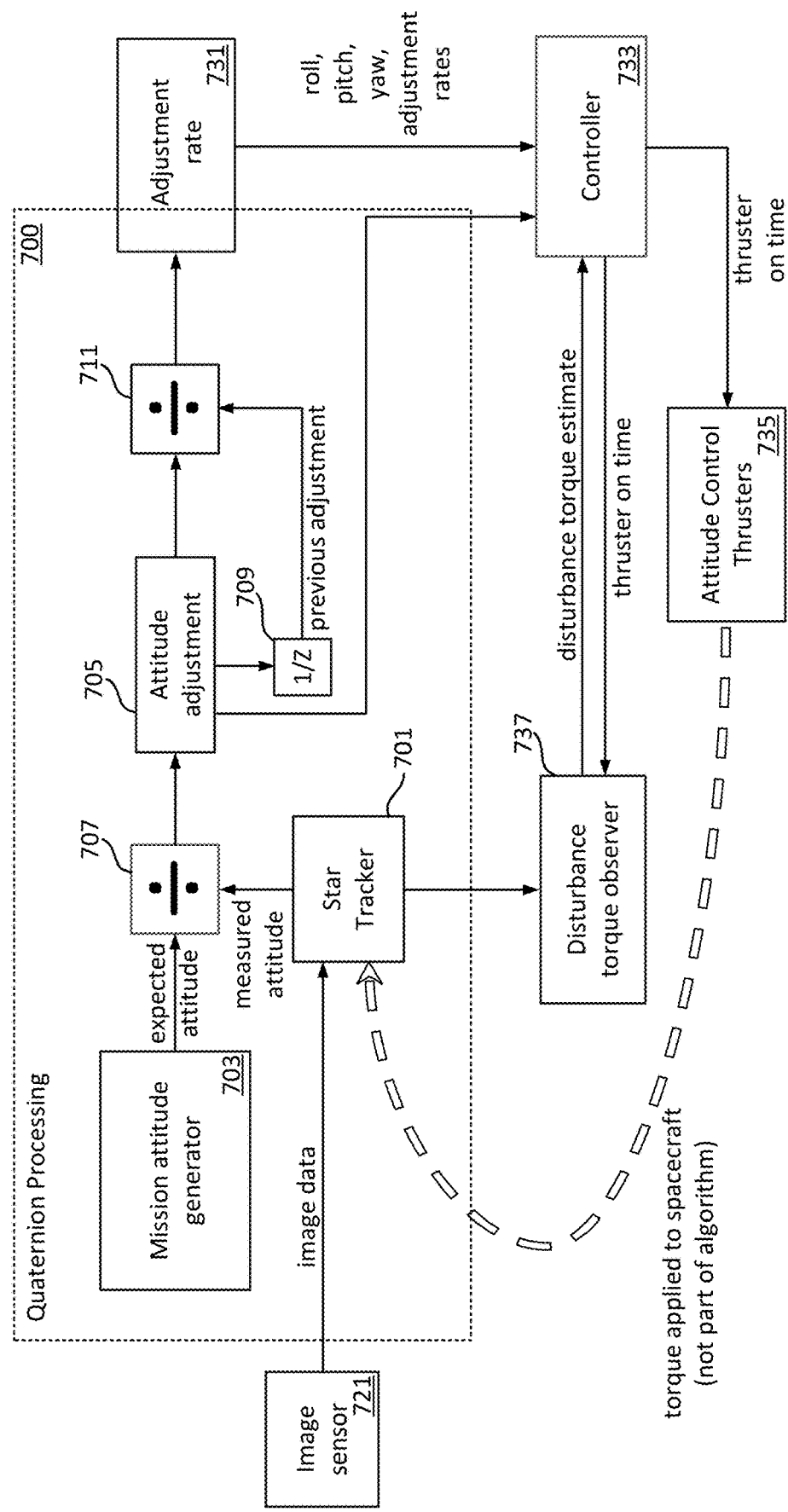
FIG. 7 is a block diagram for an attitude adjustment system without rate sensors that determines attitude adjustment and adjustment rate directly from star tracker values using quaternion processing.

FIG. 7 is a block diagram for an attitude adjustment system without rate sensors that determines attitude adjustment and adjustment rate directly from star tracker values using quaternion processing. The star tracker 701 receives image data from an image sensor 721 such as a CCD or CMOS photodetector, from which it determined an attitude corresponding to the satellite's actual alignment. The output of the star tracker is quaternion value in an Earth center inertial coordinate system, such as J2000 quaternion values for example, although other coordinate systems can be used. A mission attitude generator 703 can provide the desired attitude for the satellites current mission, where this can have previously provided by a command station operator, generated on the satellite itself, or some combination of these. The desired attitude values can be stored in memory and looked up by the processor as needed and can again be J2000 quaternion values, for example. Measured attitude is compared against the expected attitude in quaternion division operator 707, with the result then used to determine a corresponding attitude adjustment value in the attitude adjustment module 705, where the output of quaternion division operator 707 and input to attitude adjustment module 705 corresponds to the quaternionic division of the output of 701 by the output of 703.

In addition to generating attitude adjustments based on a comparison of the measured attitude and the expected mission attitude, these comparisons can also be used to determine adjustment rate values directly from the star tracker data, independently of gyros or other forms of attitude rate sensors. As the star tracker monitors the attitude of the spacecraft, a sequence of attitude adjustments are generated. By comparing the current attitude adjustment value with a preceding attitude adjustment value, the differential provides an adjustment rate value, where, depending on the embodiment, previous attitude adjustment value can be the immediately preceding attitude adjustment value or from earlier cycle. Referring back to the embodiment of FIG. 7, the attitude adjustment values from the attitude adjustment block 705 are provided to a quaternion division operator 711 and also to a zero order hold (ZOH) unit delay operator 1/Z 709. The output of zero order hold unit delay operator 1/Z 709 is the output of attitude adjustment block 705 delayed by one cycle: for example, if at a cycle $t_i$ the output of attitude adjustment block 705 is $705(t_i)$, then the output of 1/Z 709 at $t_i$ is $709(ti) = 705(t_{i-1})$, or the output of attitude adjustment block 705 from the previous cycle. Then at cycle $t_i$, $705(t_i)$ and $709(t_i)$ ($=705(t_{i-1})$) are provided to the quaternion division operator 711, where the output of quaternion division operator 711 and the input of adjustment rate block 731 corresponds to the quaternionic division of the output of output of 705 by the output of zero order hold unit delay operator 1/Z 709. In alternate embodiments, more than a single previous attitude adjustment can be used to generate high differential values for the attitude adjustment.

In the embodiment of FIG. 7, the processing starting from the measured attitude from the star tracker though the determination of the attitude adjustment values and the attitude adjustment rate values is all performed using quaternion processing, represented by the broken line block of quaternion processing 700. For example, the four components of a quaternion value can put in the form of a vector, but subject to the quaternion relationships described above. The adjustment rate block 731 straddles the quaternion processing domain as it converts the adjustment rate values in roll, pitch, and yaw rate values for determining thruster on times. As with the components of on-board computer 510, the quaternion processing 700 (as well as the controller 733 and disturbance torque observer 737 discussed below) can be implemented using hardware, firmware, software, or a combination of these. For example, logic elements programmed by firmware can perform the quaternion processing. A CPU, GPU, or other microprocessor can include a processor, FGA, ASIC, integrated circuit or other type of circuit and the software used can be stored on one or more processor readable storage devices to program one or more of the processors to perform the functions described herein. In one set of embodiments, the quaternion processing can be executed by the same CPU.

The attitude adjustment values from module 705 and the adjustment rate values from module 731 are provided to the attitude adjustment controller 733 to determine the thruster on time values, which can then be provided to the attitude control thrusters 735. The thruster on times are also provided to the disturbance torque observer 737, which also receives the measured attitude from star tracker 701, so that it can determine disturbance torque estimates from previously commanded thruster on time values and current attitude values from the star tracker 701 and provide the determine disturbance torque estimates to the attitude adjustment controller 733 to use in determining thruster on time values. The attitude control thrusters 735 then use the on times to fire the thrusters and apply torques to the spacecraft, which will result in attitude changes that will then be registered in the attitude subsequently determined by the star tracker 701. The elements of the quaternion processing block 700 (including the adjustment rate module 731), attitude adjustment controller 733, and disturbance torque observer 737 will be referred to here as one or more control circuits configured to determine thruster on times as described above and with respect to the flow chart of FIG. 8.

Figure 8:
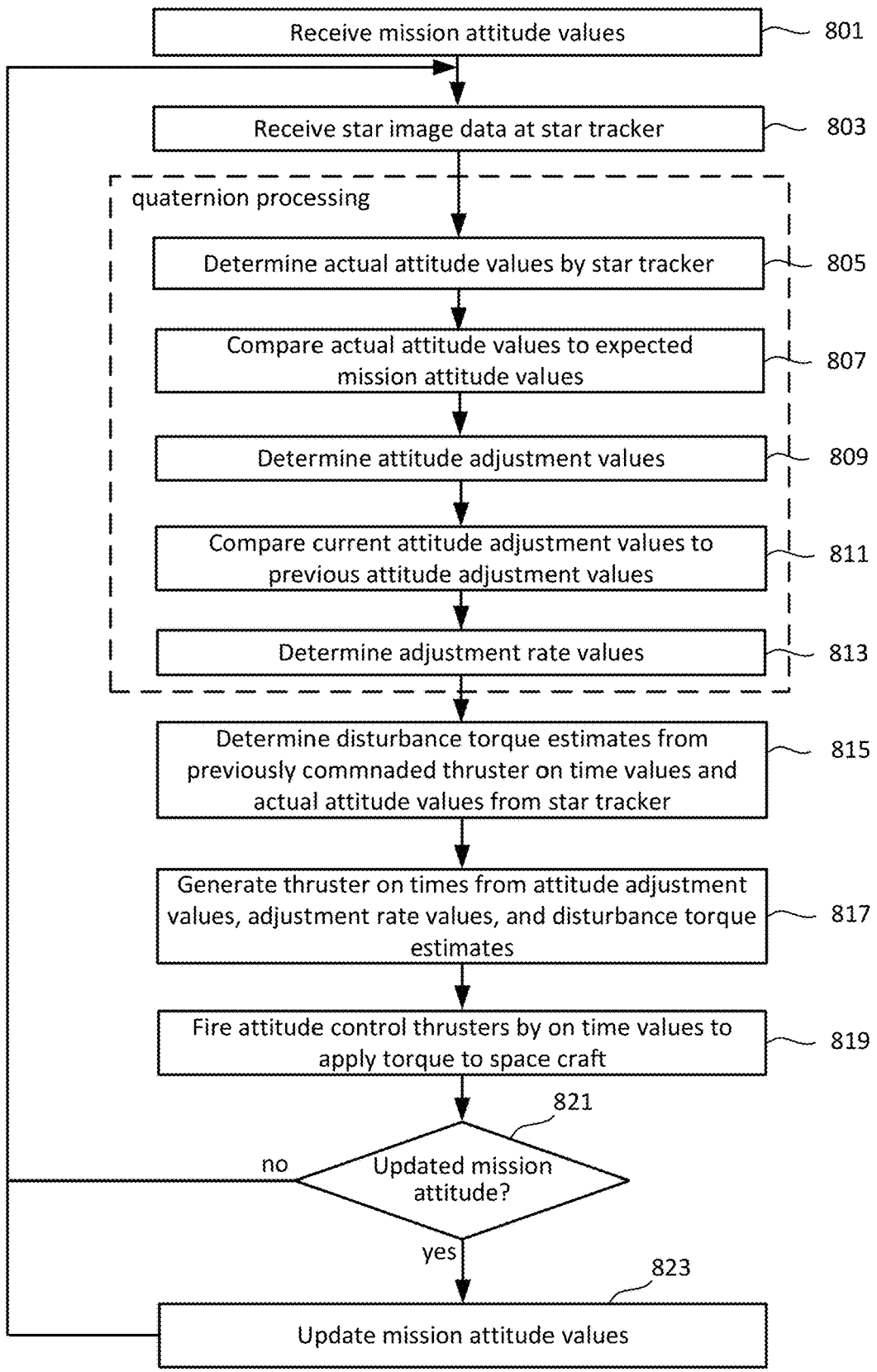
FIG. 8 is a flowchart of an embodiment for operation of the attitude adjustment system of FIG. 7.

FIG. 8 is a flowchart of an embodiment for operation of the attitude adjustment system of FIG. 7. Starting at step 801, mission attitude data is received, where this can be from a command station operator, preloaded, generated by the satellite's control systems, or combination of these. These values can be in quaternion format and stored in memory for use of the mission attitude generator 703 where they can be accessed as needed. The mission attitude data can, for example, specify an orbit, a change of orbit, or a non-orbiting spacecraft mission. At step 803 the star tracker 701 receives image data from image sensor 721. At step 803 the star tracker 701 compares the star positions in the image data with reference values to determine a satellite's attitude at step 805, which is output in a quaternion format.

The measured attitude from the star tracker 701 is compared to the specified mission attitude from the mission attitude generator 703 in quaternion division operator 707 at step 807. Based on the comparison of step 807, at step 809 the attitude adjust module 705 of the quaternion processing 700 generates attitude adjustment values. As the image sensor 721 continues to provide image data, the star tracker provides a time series of a sequence of attitude values used to generate a corresponding sequence of attitude adjustment values (in the loop back to step 803 from step 823 or 825, discussed below). At step 811, the current attitude adjustment value is compared with the previous attitude adjustment value in quaternion division operator 711, with the result of step 811 used by the adjustment rate determination module 731 to determine the attitude adjust rate based on the direct comparison of the star tracker data independently of gyros or other rate sensor. Steps 805, 807, 809, 811, and 813 are all performed using quaternion processing 700 to generate the attitude adjustment values and the attitude adjustment rate values, which are supplied to the attitude adjust controller, for which purpose they can be converted into a roll, pitch, and yaw format.

Step 815 determines disturbance torque estimates from previously commanded thruster on time values and current attitude values from the star tracker. This provides additional information on how much previous on times have changed the actual attitude of the satellite, so that the thruster on times computed from the attitude adjustment controller 733 are enhanced by the disturbance torque estimates. The attitude adjustment controller 733 generates thruster on time values for the attitude control thrusters 735 from attitude adjustment values, adjustment rate values and disturbance torque estimates at step 817. The attitude control thrusters then fire at step 819 based on the on time values, applying torque to the spacecraft to adjust its attitude. If the mission attitude is unchanged, the flow loops back to step 803 to continue monitoring and determining the series of attitude adjustments and adjustment rates. If, instead, step 821 determine that a new mission attitude (such as an orbit adjustment) has been received or generated, the mission attitude for the mission attitude generator 703 is updated at step 823 before looping back to step 803 to continue generating the time sequence of on time values.

By removing the rate sensor requirement for attitude control, the embodiments presented above simplify the spacecraft design for hardware, software, electronics and operations. These simplifications and the lack of gyros can result in overall cost savings for the satellite delivery and an increased lifetime for operations.

One embodiment includes an attitude control system including a star tracker configured to receive image data from an image sensor mounted on a spacecraft and determine a sequence of attitude values for the spacecraft from the image data and one or more control circuits connected to receive the sequence of attitude values from the star tracker. The one or more control circuits are configured to: compare the sequence of attitude values to a set of mission attitude values; determine a sequence of attitude adjustment values for the spacecraft from the comparing of the sequence of attitude values to the set of mission attitude values; compare a first of the sequence of attitude adjustment values to a previous one of the sequence of attitude adjustment values; determine an attitude adjustment rate value for the spacecraft from the comparing of the first of the sequence of attitude adjustment values to the previous one of the sequence of attitude adjustment values; and determine a set of on time values for a set of attitude control thrusters of the spacecraft from the attitude adjustment values and the attitude adjustment rate value.

One embodiment includes a method comprising: receiving from a star tracker a sequence of attitude values for a spacecraft; comparing the sequence of attitude values to a set of mission attitude values; determining a sequence of attitude adjustment values for the spacecraft from the comparing of the sequence of attitude values to the set of mission attitude values; comparing a first of the sequence of attitude adjustment values to a previous one of the sequence of attitude adjustment values; determining an attitude adjustment rate value for the spacecraft from the comparing of the first of the sequence of attitude adjustment values to the previous one of the sequence of attitude adjustment values; and determining a set of on time values for a set of attitude control thrusters of the spacecraft from the attitude adjustment values and the attitude adjustment rate value.

One embodiment includes a satellite, comprising: a set of attitude control thrusters responsive to a set of thruster on time values; an image sensor mounted on a body of the satellite; and an attitude control system configured to receive image data from the image sensor and to supply the set of thruster on time values to the set of attitude control thrusters. The attitude control system comprises a star tracker configured to receive the image data and determine a sequence of attitude values for the satellite from the image data and one or more control circuits connected to receive the sequence of attitude values from the star tracker. The one or more control circuits are configured to: compare the sequence of attitude values to a set of mission attitude values; determine a sequence of attitude adjustment values for the satellite from the comparing of the sequence of attitude values to the set of mission attitude values; compare a first of the sequence of attitude adjustment values to a previous one of the sequence of attitude adjustment values; determine an attitude adjustment rate value for the satellite from the comparing of the first of the sequence of attitude adjustment values to the previous one of the sequence of attitude adjustment values; and determine the set of on time values for a set of attitude control thrusters of the satellite from the attitude adjustment values and the attitude adjustment rate value.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An attitude control system, comprising:
    a star tracker configured to receive image data from an image sensor mounted on a spacecraft and determine a sequence of attitude values for the spacecraft from the image data; and
    one or more control circuits connected to receive the sequence of attitude values from the star tracker and configured to:
        compare the sequence of attitude values to a set of mission attitude values;
        determine a sequence of attitude adjustment values for the spacecraft from the comparing of the sequence of attitude values to the set of mission attitude values;
        compare a first of the sequence of attitude adjustment values to a previous one of the sequence of attitude adjustment values;
        determine an attitude adjustment rate value for the spacecraft from the comparing of the first of the sequence of attitude adjustment values to the previous one of the sequence of attitude adjustment values;
        determine on time values for a set of attitude control thrusters of the spacecraft from the attitude adjustment values and the attitude adjustment rate value;
        provide the on time values to the set of attitude control thrusters;
        fire the set of attitude control thrusters according to the on time values;
        while firing the set of attitude control thrusters according to a current set of on time values:
            monitor the attitude values;
            estimate an amount of change in the monitored attitude values in response to firing the set of attitude control thrusters according to the current set of on time values; and
            further determine, independently of an attitude rate sensor, the current set of on time values based on the estimated amount of change in the monitored attitude values.

2. The attitude control system of claim 1, wherein the sequence of attitude values are quaternion valued.

3. The attitude control system of claim 2, where the comparing the sequence of attitude values to the set of mission attitude values, the determining the sequence of attitude adjustment values, the comparing the first of the sequence of attitude adjustment values to the previous one of the sequence of attitude adjustment values, and the determining the attitude adjustment rate value are performed using quaternion valued processing.

4. The attitude control system of claim 3, wherein the one or more control circuits are further configured to:
    compare the sequence of attitude values to a set of mission attitude values by a quaternion division operation; and
    compare a first of the sequence of attitude adjustment values to a previous one of the sequence of attitude adjustment values by a quaternion division operation.

5. The attitude control system of claim 3, wherein the one or more control circuits are further configured to:
    convert the attitude adjustment rate value from a quaternion valued format to a roll, pitch, and yaw format, where the set of on time values are determined using from the attitude adjustment rate value in the roll, pitch, and yaw format.

6. The attitude control system of claim 1, wherein the one or more control circuits are further configured to:
    receive the set of mission attitude values prior to comparing the sequence of attitude values to the set of mission attitude values.

7. The attitude control system of claim 6, wherein the one or more control circuits are further configured to:
    update the set of mission attitude values.

8. A method, comprising:
    receiving from a star tracker a sequence of attitude values for a spacecraft;
    comparing the sequence of attitude values to a set of mission attitude values;
    determining a sequence of attitude adjustment values for the spacecraft from the comparing of the sequence of attitude values to the set of mission attitude values;
    comparing a first of the sequence of attitude adjustment values to a previous one of the sequence of attitude adjustment values;
    determining an attitude adjustment rate value for the spacecraft from the comparing of the first of the sequence of attitude adjustment values to the previous one of the sequence of attitude adjustment values;
    determining on time values for a set of attitude control thrusters of the spacecraft from the attitude adjustment values and the attitude adjustment rate value;
    providing the on time values to the set of attitude control thrusters;
    firing the set of attitude control thrusters according to the on time values;

while firing the set of attitude control thrusters according to a current set of on time values:
monitoring the attitude values;
estimating an amount of change in the monitored attitude values in response to firing the set of attitude control thrusters according to the current set of on time values; and
further determining, independently of an attitude rate sensor, the current set of on time values based on the estimated amount of change in the attitude values.

9. The method of claim 8, further comprising:
receiving at the star tracker image data from an image sensor mounted on the spacecraft; and
generate by the star tracker of the sequence of attitude values for a spacecraft from the image data.

10. The method of claim 8, wherein the sequence of attitude values are quaternion valued and the comparing the sequence of attitude values to the set of mission attitude values, the determining the sequence of attitude adjustment values, the comparing the first of the sequence of attitude adjustment values to the previous one of the sequence of attitude adjustment values, and the determining the attitude adjustment rate values are performed using quaternion valued processing.

11. The method of claim 10, further comprising:
converting the attitude adjustment rate value from a quaternion valued format to a roll, pitch, and yaw format, where the set of on time values are determined using from the attitude adjustment rate value in the roll, pitch, and yaw format.

12. The method of claim 10, further comprising:
comparing the sequence of attitude values to a set of mission attitude values by a quaternion division operation; and
comparing a first of the sequence of attitude adjustment values to a previous one of the sequence of attitude adjustment values by a quaternion division operation.

13. The method of claim 8, further comprising
receiving the set of mission attitude values prior to comparing the sequence of attitude values to the set of mission attitude values.

14. The method of claim 13, further comprising
updating the set of mission attitude values.

15. A satellite, comprising a set of attitude control thrusters responsive to on time values;
an image sensor mounted on a body of the satellite; and
an attitude control system configured to receive image data from the image sensor and to supply the on time values to the set of attitude control thrusters, the attitude control system comprising:
a star tracker configured to receive the image data and determine a sequence of attitude values for the satellite from the image data; and
one or more control circuits connected to receive the sequence of attitude values from the star tracker and configured to:
compare the sequence of attitude values to a set of mission attitude values;
determine a sequence of attitude adjustment values for the satellite from the comparing of the sequence of attitude values to the set of mission attitude values;
compare a first of the sequence of attitude adjustment values to a previous one of the sequence of attitude adjustment values;
determine an attitude adjustment rate value for the satellite from the comparing of the first of the sequence of attitude adjustment values to the previous one of the sequence of attitude adjustment values;
determine the on time values for the set of attitude control thrusters of the satellite from the attitude adjustment values and the attitude adjustment rate value;
provide the on time values to the set of attitude control thrusters;
fire the set of attitude control thrusters according to the on time values;
while firing the set of attitude control thrusters according to a current set of on time values:
monitor the attitude values;
estimate an amount of change in the monitored attitude values in response to firing the set of attitude control thrusters according to the current set of on time values; and
further determine, independently of an attitude rate sensor, the current set of on time values based on the estimated amount of change in the attitude values.

16. The satellite of claim 15, wherein the sequence of attitude values are quaternion valued.

17. The satellite of claim 16, where the comparing the sequence of attitude values to the set of mission attitude values, the determining the sequence of attitude adjustment values, the comparing the first of the sequence of attitude adjustment values to the previous one of the sequence of attitude adjustment values, and the determining the attitude adjustment rate value are performed using quaternion valued processing.

18. The satellite of claim 17, wherein the one or more control circuits are further configured to:
convert the attitude adjustment rate value from a quaternion valued format to a roll, pitch, and yaw format, where the set of on time values are determined using from the attitude adjustment rate value in the roll, pitch, and yaw format.

19. The satellite of claim 15, wherein the one or more control circuits are further configured to:
receive the set of mission attitude values prior to comparing the sequence of attitude values to the set of mission attitude values.

20. The satellite of claim 19, wherein the one or more control circuits are further configured to:
update the set of mission attitude values.

* * * * *